C. UEBELMESSER & W. WENDERHOLD.
PROJECTOR AND CAMERA COLOR CONTROL.
APPLICATION FILED SEPT. 20, 1915.

1,278,526.

Patented Sept. 10, 1918.

Charles Uebelmesser
William Wenderhold
INVENTORS

WITNESSES
Daniel J. Hickey
A W McClelland

UNITED STATES PATENT OFFICE.

CHARLES UEBELMESSER AND WILLIAM WENDERHOLD, OF NEW YORK, N. Y., ASSIGNORS TO POLYCHROMATIC FILM CORPORATION, A CORPORATION OF NEW YORK.

PROJECTOR AND CAMERA COLOR CONTROL.

1,278,526. Specification of Letters Patent. Patented Sept. 10, 1918.

Application filed September 20, 1915. Serial No. 51,730.

*To all whom it may concern:*

Be it known that we, CHARLES UEBELMESSER and WILLIAM WENDERHOLD, a subject of the Emperor of Germany and a citizen of the United States, respectively, residing at New York city, county and State of New York, have invented certain new and useful Improvements in Projector and Camera Color Control, of which the following is a full, clear, and exact description.

This invention relates to picture taking and projecting apparatus, and more particularly to a device arranged to vary the density of colored light to pass through an objective such as used in such apparatus.

The object of our invention is to improve the taking of pictures in colors.

Another object of our invention is to improve the projection of pictures in colors and to arrange a color screen with a means to adjust the density of the colors.

It is a well known fact that taking pictures under colored screens is greatly improved if the color density of the screen is correct and in accordance with the condition of light, and we therefore have arranged to control the density of the color by simple adjustment.

It is also well known that if green or blue and red pictures are projected by means of a lemon-yellow light, they appear in true to nature colors, if the yellow of the light screen is in the right proportion. We therefore have arranged to control the density of the color by simple adjustment of a colored screen. This screen is therefore placed in the path of light at a point where the light rays are being condensed.

Figure 1:
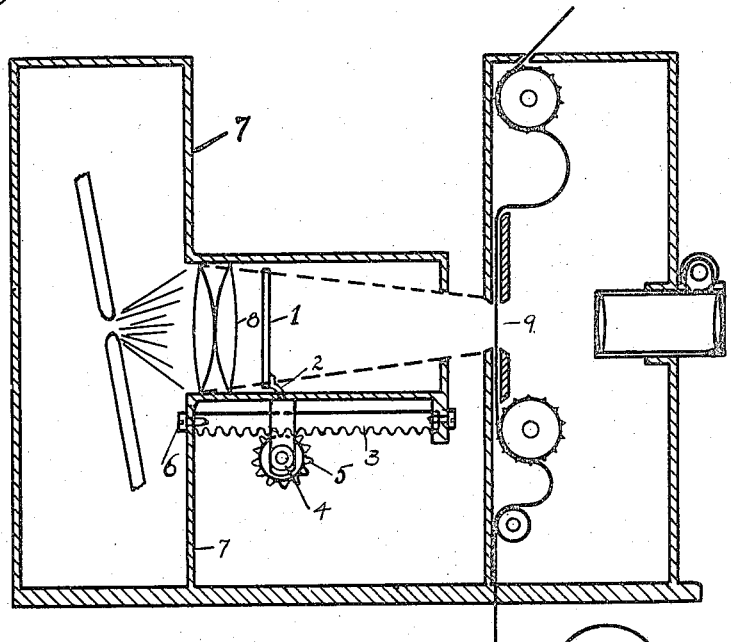
Figure 1 is a side view of a kinetoscope projector embodying our invention.

As seen in Fig. 1, a colored transparency is held by frame 2, said frame being carried by rack bar 3. The frame 2 is shifted on the bar 3 by the knurled knob 4 and gear 5, and the bar 3 is fastened to the general kinetoscope lamp house frame 7 by screw 6. The light rays emerge from the condenser lenses 8 to aperture 9 in conical shape. It is therefore seen that if the transparent color screen is near to the condenser lenses all the amount of color carried thereby is condensed down to aperture 9, and if moved away from condenser lenses the amount of color condensed by the light rays becomes smaller and the colors paler in the aperture 9.

Figure 2:
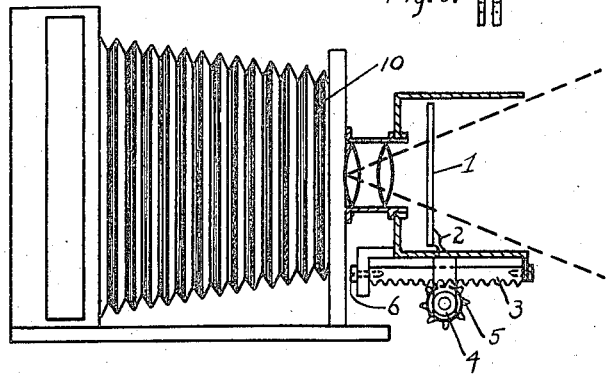
Fig. 2 is a side view of a photographic camera embodying our invention.

As seen in Fig. 2, the same device is fastened on the camera 10, preferably in front of the lens, and the same operative description as in Fig. 1 applies here.

Figure 3:
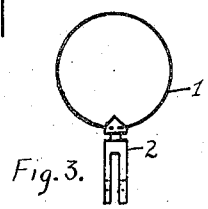
Fig. 3 is a front view of one form of color screen that may be used, showing a method of mounting same.

As seen in Fig. 3, the transparent screen 1 is mounted on frame 2, and shows but one of many manners or means of mounting the same.

The device is very useful in taking and projecting colored photographic pictures.

What we claim is:

1. In combination with a picture apparatus or the like, having a condenser lens for receiving and emitting light rays, a colored transparency in said path of light and adapted to be moved to and from said lens in the optical axis thereof, and operating means therefor.

2. In combination with a picture apparatus having a source of light and a picture and a lens and a condenser for the light rays, a colored transparency in said path of light adapted to be moved to and from said lens and picture and operating means therefor, for the purpose of imparting to the picture a desired tone of colored light.

3. In combination with an apparatus for the production of colored pictures, a colored transparent material placed in the optical axis of said apparatus, adapted to be moved in the light rays of said apparatus to and from an objective and to and from the condenser lenses, and operating means therefor, for the purpose of adjusting the density of the colors.

4. In combination with a projection lantern, a source of light having condenser lenses in the path of the light rays, a colored transparent material in the optical axis of said condensers, said transparency supported by an adjustable carrier, said carrier and transparent material movable in the path of light to and from said condensers, and operating means therefor.

5. The combination with an apparatus for the production of colored pictures having a condenser lens for receiving and emitting light rays, of means adjustable relative to said lens and located in the light rays emitted by said lens for controlling the density of the colors thereof.

Signed at Ossining, New York, this 23rd day of August, one thousand nine hundred and fifteen.

CHARLES UEBELMESSER.
WILLIAM WENDERHOLD.

Witnesses:
 DANIEL J. HICKEY,
 A. W. McCLELLAND.